June 26, 1951  R. A. WHITLOCK, JR  2,558,471
FLOAT VALVE
Filed Dec. 27, 1949
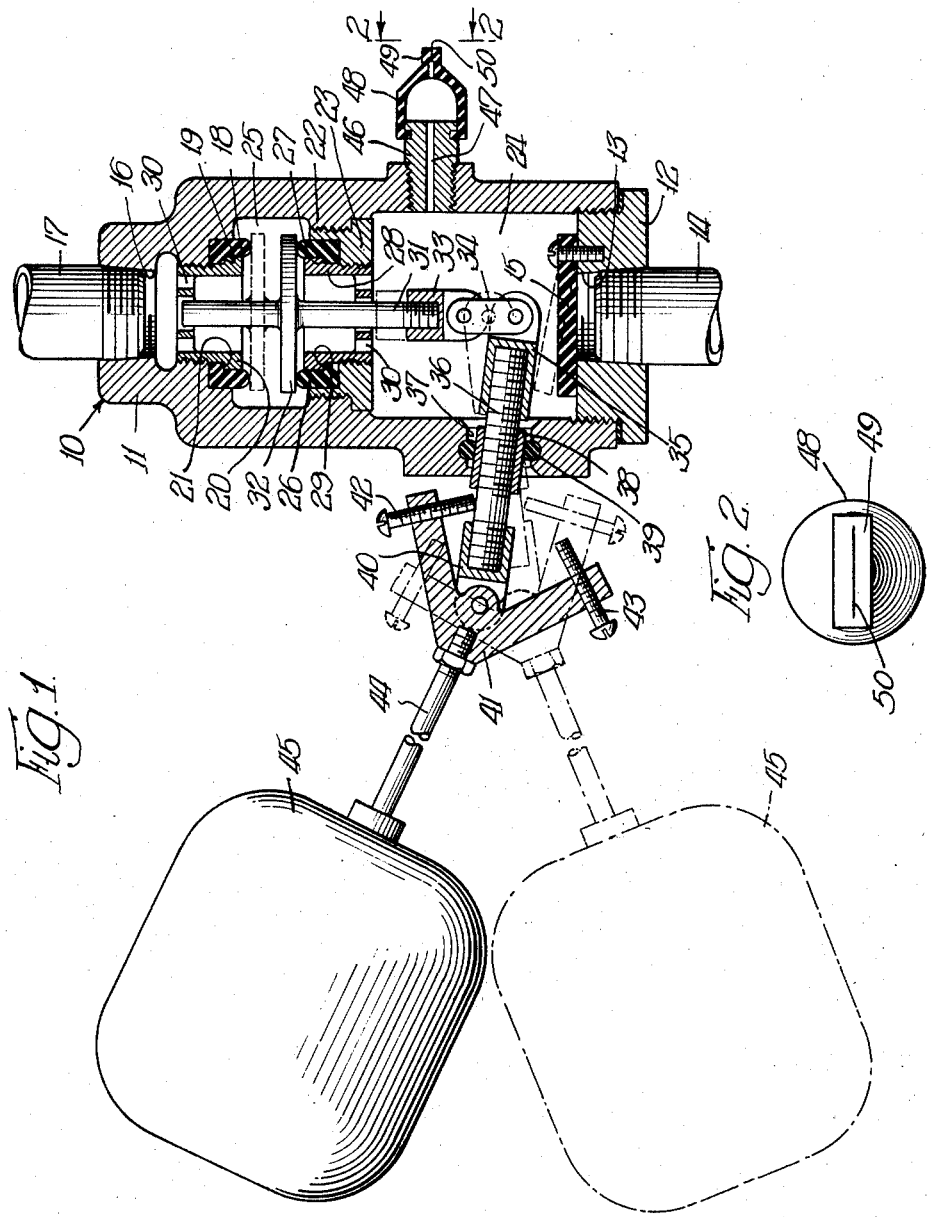
INVENTOR.
Robert A. Whitlock, Jr.
BY
McCanna and Morsbach
Attys.

Patented June 26, 1951

2,558,471

UNITED STATES PATENT OFFICE 2,558,471

FLOAT VALVE

Robert A. Whitlock, Jr., Rockford, Ill., assignor to Automatic Pump & Softener Corporation, Rockford, Ill., a corporation of Illinois Application December 27, 1949, Serial No. 135,123

6 Claims. (Cl. 277—13)

The present invention relates to a float valve, and more specifically to a float valve for the brine tank of a zeolitic water softening apparatus.

The disclosed embodiment of the invention comprises a valve casing having a brine inlet, a combined brine outlet and fresh water inlet, a restricted fresh water outlet, and a disc valve movable to seat on either of two opposed valve seats for stopping outflow of brine or inflow of fresh water, as the case may be. Seating of the valve is controlled by a float having a lost motion connection with one end of a lever which extends through an aperture in the casing and has its other end pivotally connected to a valve stem carrying the valve disc, the lever being rockable on the sealing means in the aperture. Suitable check valves are provided to prevent outward flow through the brine inlet and inward flow through the fresh water outlet, in the present instance comprising, respectively, a flap valve and a beer vent. The brine inlet is connected to a pipe through which brine may be drawn from adjacent the bottom of the tank, and the common brine outlet and water inlet is connected by a pipe to the main control valve means for the softening apparatus. The fresh water outlet opens into the tank above the lower brine level and below the upper brine level. For simplicity of construction, the casing is chambered, with the brine inlet and water outlet in one chamber and the disc valve, valve seats, and common brine outlet and water inlet in the other chamber, there of course being communication between the chambers. The communication is provided by an aperture in the dividing partition, one of the valve seats being disposed about this aperture and the other about the common outlet and inlet.

The construction is very simple, and such that the valve may easily and quickly be assembled and disassembled, as in cleaning, inspecting, or replacing parts. The arrangement of the disc valve between the valve seats provides for positive closing of the valve and ready opening thereof. The restricted water outlet permits raw water to enter the tank without undue agitation of the brine therein, to provide a substantially salt free raw water layer above the brine to prevent salt encrustation of the upper part of the tank. The provision of a single disc valve working between two seats is particularly advantageous in that it is simpler in adjustment and operation than two valves, even on a common stem, and can be set to operate satisfactorily even if one of the seats wears more rapidly than the other, without replacement of the seat.

One object of the present invention is to provide an improved float valve for a water softener brine tank or the like which is simple in construction, easy to assemble, and positive in operation.

Another object is the provision of a chambered float-controlled valve adapted for two-way flow therethrough which has a single disc valve movable between, and engageable on either of, two opposed seats in one of the valve chambers.

It is a further object of the invention to provide a chambered float-controlled valve having an inlet and a restricted outlet in one chamber, and a combined outlet and inlet in the other chamber and a disc valve movable between opposed seats for controlling flow through the combined outlet and inlet.

Still another object is the provision of a float-controlled valve of chambered construction having an inlet and a restricted outlet passage in one chamber and a valve-controlled combined outlet and inlet passage in a communicating chamber, with a valve to prevent outflow through said inlet, for slow outflow through said restricted outlet passage upon inflow through said combined passage.

It is also an object of the invention to provide a float-controlled valve having a disc valve with two seats on either of which it may be seated by movement of a float, and an adjustable lost-motion means in the connection between the float and valve.

Other and further objects, advantages, and features of the invention will be apparent to those skilled in the art from the following description, taken with the accompanying drawings, in which—

Figure 1 is a vertical sectional view of the valve, showing one closed position thereof in full lines and another closed position in dotted lines; and Fig. 2 is an elevational view of the check valve along line 2—2 of Figure 1.

Referring to the drawing, the illustrated embodiment of the invention comprises a valve structure designated generally by the reference numeral 10, having a generally cylindrical casing 11 with an open end in which is suitably secured a closure plug 12. The plug has a passage 13 therethrough in which is connected one end of an inlet pipe 14 and the other end of which is disposed adjacent the bottom of the brine tank in which the valve structure is disposed. A suitable check valve which may be a simple flap valve 15 formed of rubber, leather, or the like, is provided to close the inlet passage against flow outwardly of the casing 11.

At the end of the casing opposite that provided with the inlet passage 13 is a combined outlet and inlet passage 16 in which is engaged one end of a pipe 17 leading to the main control valve mechanism for the water softening apparatus of which the brine tank is a part. About the inner end of the passage 16 is disposed an annular valve seat 18, preferably of deformable or yielding material such as rubber, having a shoulder 19 along its inner periphery. A hollow securing member 20 having an external peripheral flange 21 is threadably secured in the passage 16 to hold the valve seat in a recess formed in the casing by engagement of the flange 21 and shoulder 19. The securing member 20 in effect forms part of the passage 16. The valve seat 18 projects from the recess to present a seating surface interiorly of the casing 11.

On the interior of the casing is formed an annular threaded boss 22 between the passages 13 and 16, which receives a partition member 23 to divide the casing into two compartments or chambers 24 and 25, into which open respectively the passages 13 and 16. The partition member has an aperture or passage therein for communication between the chambers, and this communication passage is enlarged at its end adjacent the chamber 25 to provide a recess receiving a valve seat 26 which may conveniently be identical to the valve seat 18, with an internal shoulder 27. A hollow cylindrical securing member 28, conveniently identical to the securing member 20, and having an external flange 29, is threaded in the communication passage to hold the valve seat 26 in the recess. A portion of the valve seat projects into the chamber 25 to provide a seating surface inwardly thereof. The valve seats 18 and 26 are axially alined and extend toward each other.

Each of the securing members 20 and 28 has a valve guide 30, preferably formed integral therewith, in the form of a spider with a circular guide element coaxial with the valve seats. Extending through the valve guides 30 is a valve stem 31 carrying at an intermediate portion thereof a valve disc 32 each face of which is adapted to engage in seated relation on one of the valve seats 18 and 26. The lower end of the stem 31 projects into the chamber 24, and is threaded into a socket or cap 33 having a slotted end to which is pivoted a link 34. The link extends downwardly from the cap 33 and is pivoted at its lower end to a cap 35 similar to the cap 33, but extending at an angle thereto. Secured in the cap 35 is the inner end of a lever or threaded pin 36 extending out of the casing 11 through a suitable aperture 37 therein. A sleeve 38 is disposed on the pin at the portion thereof engaged in the aperture, and a suitable seal such as an O ring 39 engages about the sleeve and in a suitable groove formed in the aperture 37. The pin 36 is rockable in the aperture, and the O ring 39 serves both as a seal and as a fulcrum for the pin. The outer end of the pin 36 is engaged in a cap 40 similar to the caps 33 and 35. By providing for threaded engagement of the caps 35 and 40 and the sleeve 38 on the pin, its throw may be adjusted to vary the travel of the valve stem 31. The stem may also be adjusted to vary the position of the valve disc 32 relative to the valve seats 18 and 26 by means of its threaded engagement in the cap 33.

The cap 40 is pivoted by its bifurcation to an angle bracket or member 41 having an adjusting member extending through each end portion thereof and engageable with the pin 36. These adjusting members may be the upper and lower screws 42 and 43. Secured to the apex of the angle member 41 is the end of a rod 44 extending from the float 45 which controls closing of the valve disc 32. It will be clear that the angle member 41 provides a lost motion connection between the float and pin.

A spud 46 is secured in an aperture in the casing 11, with a bore 47 of small diameter extending therethrough and opening into the chamber 24, which bore provides a restricted outlet passage for refill water flowing to the brine tank. A suitable check valve is provided to prevent inward flow through this passage. In the present embodiment, this valve takes the form of a beer vent 48, comprising a nipple or cap of rubber or like material secured on the outer end of the spud 46. A projection 49 on the cap has a slit 50 extending therethrough communicating with the interior of the cap and providing a pair of lips which will spread apart when subjected to the pressure of outflowing fluid, but which normally are closed, and are forced tightly together by the pressure of fluid tending to flow inwardly, so as to prevent such inward flow.

The construction of the valve has been described, and a brief explanation of its operation will make the invention clear. In water treating apparatus of the base exchange type, raw water is passed through base exchange material, commonly in a tank, which removes the "hard" elements in the water. The absorptive capacity of the base exchange material for these hard elements is good, but limited, so that the material must be regenerated from time to time. Regeneration is accomplished by passing brine therethrough to carry off the hard elements. Suitable main valve means are employed to control the operation of the apparatus, and commonly the arrangement is such that during the regenerating cycle water flowing to the base exchange material passes through an ejector to create subatmospheric pressure in the pipe 17 to draw brine from the brine tank and during the softening cycle a portion of the water flowing to the zeolitic material is diverted to the brine tank through the pipe 17 until the brine tank is refilled.

What may be termed the normal position of the valve 10 is indicated in the figure by full lines. This position is that during the softening cycle with the liquid in the brine tank at the desired level. During regeneration the pipe 17 is connected to the suction side of an ejector which lifts the valve disc 32 slightly off the seat 26, lifts the flap valve 15, and draws brine from the tank through the pipe 14. As the brine flows out, the float 45 descends with the liquid level and the upper screw 42 of the lost motion device moves away from the pin 36 allowing the disc 32 to assume an intermediate position. As the float approaches the dotted line position, the screw 43 engages the pin 36 and upon continued descent of the float the disc 32 moves to its dotted line position terminating the brine flow.

The disc 32 is now held seated on the valve seat 18 by the difference in pressure within the chamber 25 and the pipe 17 and also by action of the float in urging the lower adjusting screw 43 of the angle member 41 against the pin 36. Thus, any tendency of the valve disc to move off the seat 18, necessarily rocking the pin to cause raising of its outer end, is resisted by the weight of the float, which would have to rise with the rocking of the pin 36. When the main valve means of the apparatus is again manipulated to cause water to flow through the pipe 17 to refill the brine tank, sufficient pressure is exerted on the valve disc 32 to move it slightly off the seat 18, so that the refill water may flow into the chamber 24. The pressure also closes the flap valve 15, and the water therefore can flow out of the valve casing 11 only through the restricted outlet passage 47 and valve 48. Because the outlet is restricted, the rate of outflow is slow, though it may vary somewhat. As the refill water flows out of the casting 11 into the tank, the float is raised and permits the valve disc to move downwardly away from the seat 18, but prevents it from seating on the lower valve seat 26 to close the valve against further inflow of the water until the full line position of the figure is reached. The float holds the disc seated on the valve seat 26, and may be assisted by pressure in the pipe 17, as by diversion to the brine tank of some of the water flowing to the zeolitic material during the softening cycle.

It will be seen that the provision of a valve disc, movable between two seats to shut off flow in one or the other direction, is more positive and requires less adjustment than would otherwise be the case. Adjustment of the valve disc relative to the seats may be made readily by means of the threaded connection of the valve stem with the cap 33. Again, there is less interference to flow through the valve casing when only one valve disc is employed. It will also be seen that use of one disc between two seats permits the seats to be of yielding material to assure positive stoppage of flow, and to be included in the valve assembly in removable and replaceable relation without causing undue bulkiness thereof.

Another advantage of the present valve construction is due to the provision of the restricted outlet passage for the refill water. The brine in the tank will cause salt encrustation of the interior of the tank above the liquid level, with consequent early rusting and corrosion, unless steps are taken to prevent it. A simple way to avoid such encrustation is to provide a layer of fresh water above the brine. The restricted outlet causes the refill water to enter the tank above the brine and settle thereon in a relatively gentle manner, thus avoiding stirring up of the brine and mixing of salt with the fresh water layer, and avoiding splashing of brine against the upper part of the tank. It will be obvious that the valve 48 prevents either water or air from being drawn into the valve casing 11 during the regenerating cycle, so that the brine is not undesirably or unpredictably diluted by the water, or the suction broken by the air. Also, the small diameter of the passage 47 prevents outflow therethrough when brine is being withdrawn through the valve casing.

While the valve construction is especially adapted for use in a water softener brine tank and has been described in connection with such apparatus, it will be obvious that it is advantageous in many other applications of regulatory valves of the float type, and it is not intended that the invention be limited in application to brine tanks of water softening apparatus.

I claim:

1. A valve comprising in combination a casing, a partition dividing said casing into two chambers, an inlet passage and a restricted outlet passage in one of said chambers, a combined outlet and inlet passage in the other chamber, a communication passage in said partition between said chambers, a valve seat about said combined passage, a valve seat about said communication passage and in said other chamber, said valve seats being axially alined and disposed facing each other, a valve member adapted to seat on one or the other of said valve seats and disposed between said seats, a stem extending from said valve member, an aperture in said casing, a lever extending through said aperture and rockable therein, a connection between said valve stem and the inner end of said lever, a float outside said casing connected to said lever for moving the valve member between said seats, a check valve for said inlet passage to prevent outward flow therethrough, and a check valve for said restricted outlet passage to prevent inward flow therethrough.

2. A valve comprising in combination a casing having an inlet passage and a combined inlet and outlet passage, a check valve to prevent outward flow through said inlet passage, a restricted outlet passage in said casing, a check valve to prevent inward flow through said outlet passage, an apertured partition in said casing between said inlet and restricted outlet passage and said combined passage, a pair of opposed valve seats axially alined and disposed one about said combined passage and the other about the aperture in said partition, a valve member movable between said seats and engageable on each, a stem extending from said valve member, an opening in said casing, a lever extending through and pivotally supported in said opening in sealed relation thereto, means pivotally connecting said stem to said lever, and a control float outside said casing connected to the outer end of said lever to effect movement of said valve member between the seats.

3. A float valve comprising in combination a chambered casing, a passageway providing communication between the chambers, a first valve seat in one of said chambers about said passageway, a combined outlet and inlet passage in said one chamber opposite said passageway, a second valve seat about said combined passage axially alined with said first seat, a valve member movable between said seats, a stem extending from said valve member into the other chamber, a lever extending through the casing wall into said other chamber, said lever being rockably supported in said wall, means connecting said lever and stem, a control float outside said casing, adjustable lost motion means connecting said float and lever, an inlet passage and a restricted outlet passage in said other chamber, a check valve to prevent outward flow through said inlet passage, and another check valve to prevent inward fluid flow through said outlet passage.

4. A liquid level regulator valve comprising a chambered casing, a communication passageway between the chambers, a first valve seat about said passageway in one of said chambers, a combined outlet and inlet passage in said one chamber opposite said passageway, a second valve seat about said combined passage axially alined with said first seat, a valve member movable between said seats and engageable on each in closing relation, an inlet passage and a restricted outlet passage in the other chamber, a flapper valve within the casing for preventing outward flow through said inlet passage, a slitted rubber body forming a check valve to prevent inward fluid flow through said outlet passage, an aperture in said casing, a lever extending through said aperture, sealing means pivotally supporting said lever in said aperture, a stem extending from said valve member, means within said casing connecting said stem and said lever, a regulating float outside said casing, means pivotally connecting said float and the outer end of said lever to move the valve member between said seats.

5. A liquid level regulator valve comprising a chambered casing, a communication passageway between the chambers, a combined outlet and inlet passage in one of said chambers, an inlet passage and a restricted outlet passage in the other chamber, a valve preventing outflow through said inlet passage, valve means preventing inward fluid flow through said outlet passage, a first valve seat in said one chamber about said communication passageway, a second valve seat about said combined passage axially alined with said first seat, a valve member movable between said seats and engageable on either thereof, a stem extending from said valve member, an aperture in said casing, a lever extending through said aperture, an O ring surrounding the lever and seated in the casing providing a seal and a pivotal support therein, means connecting said stem and lever within said casing, a float outside said casing, means pivotally connecting said float and the outer end of said lever for relative vertical movement, and adjustable limiting means to control the degree of said movement.

6. A liquid level regulator valve comprising a chambered casing, a communication passageway between the chambers, a combined outlet and inlet passage in one of said chambers, a first valve seat in said one chamber about said passageway, a second valve seat about said combined passage axially alined with said first seat, a valve member disposed between said seats and movable to seat on either thereof, a stem extending from said valve member, a float outside said casing, an aperture in said casing, a lever extending through and pivoted in said aperture, means connecting said float and the outer portion of said lever, means connecting said stem and the inner portion of said lever, an inlet passage and a restricted outlet passage in the other chamber, a valve preventing outflow through said inlet passage, and valve means preventing inward fluid flow through said outlet passage, said valve means comprising a hollow member of resilient and relatively soft material disposed over the outer end of said outlet passage and having a flattened projecting portion with a slit therethrough defining a pair of lips compressible to close said slit.

ROBERT A. WHITLOCK, Jr.

REFERENCES CITED

The following references are of record in the file of this patent:

UNITED STATES PATENTS

| Number | Name | Date |
|---|---|---|
| 1,851,927 | McCord | Mar. 29, 1932 |
| 2,513,839 | Pruitt | June 27, 1950 |

FOREIGN PATENTS

| Number | Country | Date |
|---|---|---|
| 345,176 | Germany | Dec. 6, 1921 |